United States Patent [19]

Gileta

[11] Patent Number: 5,568,894
[45] Date of Patent: Oct. 29, 1996

[54] APPLYING FLUX TO A SOLDER WAVE FOR WAVE SOLDERING AN ELEMENT

[75] Inventor: John H. Gileta, Chateauguay, Canada

[73] Assignee: Electrovert Ltd., La Prairie, Canada

[21] Appl. No.: 347,606

[22] Filed: Nov. 30, 1994

Related U.S. Application Data

[63] Continuation-in-part of Ser. No. 72,568, Jun. 4, 1993, abandoned.

[51] Int. Cl.$^6$ .......................... B23K 35/36; B23K 35/38; B23K 31/02
[52] U.S. Cl. ......................... 228/219; 228/223; 228/260
[58] Field of Search .................................. 228/224, 260, 228/219, 220, 223

[56] References Cited

U.S. PATENT DOCUMENTS

| | | |
|---|---|---|
| 2,870,532 | 1/1959 | Young . |
| 4,360,144 | 11/1982 | Cuddy et al. . |
| 5,044,542 | 9/1991 | Deambrosia . |
| 5,048,746 | 9/1991 | Elliott et al. . |
| 5,090,651 | 2/1992 | Mittag . |
| 5,121,874 | 6/1992 | Deambrosia et al. . |
| 5,203,489 | 4/1993 | Gileta et al. . |
| 5,240,169 | 8/1993 | Gileta . |
| 5,292,055 | 3/1994 | Gileta . |
| 5,361,969 | 11/1994 | Gileta . |
| 5,390,845 | 2/1995 | McDonald ............................. 228/219 |

OTHER PUBLICATIONS

*Metals Handbook*, 9th Edition, vol. 6, ASM, Metals Park, OH, Aug. 1983, p. 8.

*Primary Examiner*—P. Austin Bradley
*Assistant Examiner*—Jeffrey T. Knapp
*Attorney, Agent, or Firm*—Darby & Darby, P.C.

[57] ABSTRACT

An arrangement of applying flux in solid, liquid or gaseous form directly to the solder wave avoids prefluxing of printed circuit boards or other elements to be soldered or solder wetted. The process for wave soldering an element comprises the steps of forming a solder wave above a solder reservoir, applying a flux directly to the solder wave separately from a shield gas delivery means to blanket the solder wave, and conveying the element through at least a portion of the solder wave. The process is applicable to wave soldering under a shroud wherein a gas shield is supplied by diffusers under the shroud, the flux being applied by at least one gas applicator directly to the solder wave.

22 Claims, 1 Drawing Sheet

APPLYING FLUX TO A SOLDER WAVE FOR WAVE SOLDERING AN ELEMENT

CROSS REFERENCE TO RELATED APPLICATION

The present application is a continuation-in-part of application Ser. No. 08/072,568 filed Jun. 4, 1993, now abandoned.

TECHNICAL FIELD

The present invention relates to wave soldering and more particularly to applying flux directly to a solder wave to assist in solder wetting.

BACKGROUND ART

The term "flux" used throughout the specification applies to a solid, gas or liquid agent that promotes solder wetting and good solder joints through removal of surface oxides on the metallic surfaces to be soldered. Traditional flux used with lead based solder is a liquid flux, however, flux may also be applied in powder or granular form, or in a gaseous form such as a reducing gas to reduce surface oxides. If soldering occurs in an atmosphere which is substantially oxygen free, then in some cases the quantity of flux required for good solder wetting may be reduced.

In the past, flux has generally been applied by flux applicators wherein the circuit boards or elements to be solder coated or solder joined have flux applied thereto prior to passing through a solder wave.

In U.S. Pat. Nos. 5,044,542 and 5,121,874 to Deambrosio et al a shield gas is applied about a solder wave and the more conventional type of fluxes need not be used. Instead the shield gas may contain a reducing agent which acts as a flux to prevent oxidization on the surfaces to be solder wetted. In these patents, the shield gas may be applied by diffusers positioned on both sides of the solder wave below the conveyor path and over the solder wave above the conveyor path.

In U.S. Pat. No. 5,048,746 to Elliott et al is disclosed a reducing gas atmosphere which includes a small quantity of hydrogen, insufficient to provide an explosive mixture. The term "fluxing" referred to in U.S. Pat. No. 5,048,746 may not specifically include a reducing gas, however, the term "fluxing" used in the present application is to include any agent that promotes solder wetting and this could be a reducing gas or other agent such as adipic acid and the like.

In U.S. Pat. No. 5,090,651 to Mittag a tunnel is provided through which elements pass on a conveyor. A solder wave is disclosed in the tunnel. The tunnel has gas curtains and in at least one embodiment, reference is made to an additive included with the gas curtains so that elements passing into the tunnel prior to soldering are contacted with an additive. This additive may be a flux in solid, liquid or gaseous form, the solid form being a powder or in granular form, a gas can include a reducing agent gas to provide a fluxing action, and in another embodiment adipic acid additive or other acidic compounds in powder or liquid form are disclosed as being added at the gas curtains. In the tunnel, the atmosphere is controlled generally to provide an atmosphere which is substantially oxygen free. The flux may be entrained, sprayed, atomized or the like, directly into the gas supply forming the gas curtain so it is applied to the elements passing into the tunnel.

In U.S. Pat. No. 5,203,489, the disclosure of which is incorporated herein by reference, is disclosed a shroud placed around a solder wave having a slot for the solder wave to project therethrough and provision is made for gas to be provided under the shroud through gas diffusers to blanket the solder wave with a gas that substantially excludes oxygen and preferably is an inert gas such as nitrogen.

The patent discloses supplying gas through the gas diffusers and states that the type of gas may include a reducing gas and may include additives which are desirable for solder coating of wettable metallic surfaces or for joining at least two wettable metallic surfaces.

In U.S. Pat. No. 5,240,169, the disclosure of which is incorporated herein by reference, is disclosed shrouds placed around solder waves with diffusers positioned under the shrouds to blanket the solder wave with shield gas. The patent discloses a fluxer to add flux to the elements prior to preheating and application of solder. Therefore there is no suggestion in this patent that a reducing agent or other additive be included with the shield gas. The patent also shows a gas knife positioned after the solder wave. The gas knife is used to blow off any excess solder on the element after it exits from the solder wave. The gas used is a shield gas or may be air. Clearly the gas knife is not used for the addition of flux or a reducing gas.

In U.S. Pat. No. 5,292,055, the disclosure of which is incorporated herein by reference, is disclosed yet a further embodiment of a shrouded solder wave.

DISCLOSURE OF INVENTION

We have now found that fluxing can be performed at the solder wave by having flux in gas form, liquid form or solid form, i.e., powder or granular form, applied directly to the solder wave so that fluxing occurs as the element passes through the solder wave. In the case of wave soldering under a shroud, such as that disclosed in U.S. Pat. Nos. 5,203,489, 5,240,169 and 5,292,055, diffusers are provided beneath the shroud on both sides of the solder wave. These diffusers supply shield gas to blanket the solder wave and in at least one embodiment, a reducing gas or other additive is added to the shield gas. We have found, however, that flux in one of its many forms applied directly to the solder wave by a flux applicator or a gas knife, which is separate to a gas diffuser, provides a satisfactory flux application- This avoids having to preflux and also allows less flux to be used than when applied with shroud gas to blanket the solder wave.

The present invention provides a process for wave soldering an element comprising the steps of forming a solder wave above a solder reservoir, applying a flux from a flux applicator separate from a shield gas delivery means to blanket the solder wave, the flux applicator directing the flux onto the solder wave, and conveying the element through at least a portion of the solder wave.

BRIEF DESCRIPTION OF DRAWINGS

In drawings which illustrate embodiments of the present invention.

MODES FOR CARRYING OUT THE INVENTION

Figure 1:
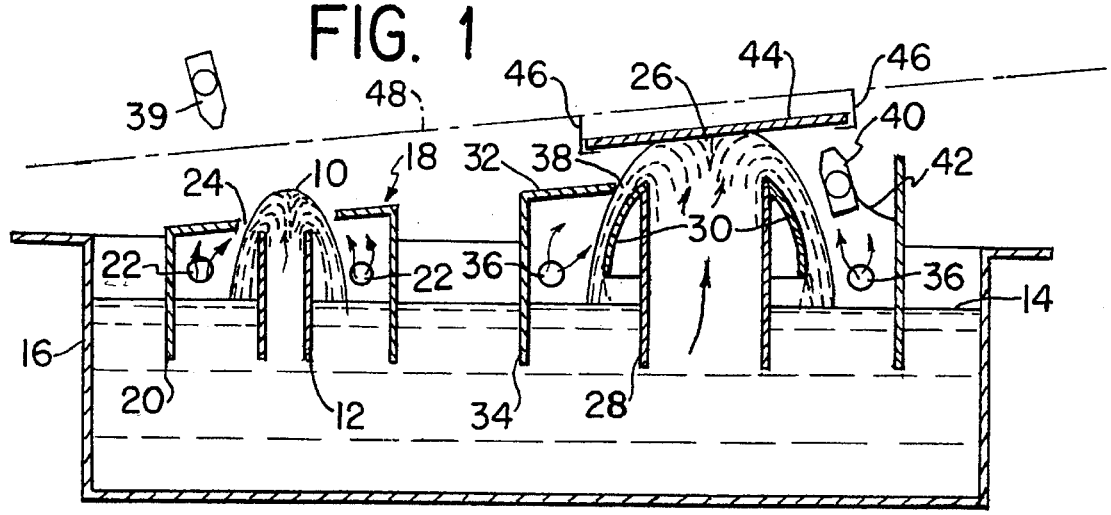
FIG. 1 is a schematic side elevation showing a circuit board being conveyed through two shrouded solder waves.

As seen in FIG. 1, a first solder wave 10 extends from a solder nozzle 12 above the solder level 14 in a solder reservoir 16. The first solder wave 10 is a turbulent solder wave and the solder falls back into the solder reservoir 16. A shroud 18 extends over the solder wave and has skirts 20 extending down below the level of the solder wave. Diffuser tubes 22 are positioned inside the shroud 18 on both sides of the solder wave and shield gas from the diffusers passes through a slot 24 in the shroud 18 on both sides of the solder wave 10 to provide a blanket of gas over the solder wave 10. A second solder wave 26 is shown as a non-turbulent bidirectional solder wave with a nozzle 28 having contoured guides 30 to ensure a smooth flow of solder back to the solder reservoir 16. A second shroud 32 with skirts 34 surrounds the second solder wave 26 and on the upstream side, a diffuser tube 36 provides a shield gas to blanket the solder wave passing up through a slot 38 in the second shroud 32 on the upstream side of the second solder wave. A first applicator 39 is positioned upstream of the first solder wave 10, above the solder wave, to direct flux directly onto the solder wave 10. On the downstream side of the second solder wave 26, a diffuser tube 36 is positioned and just above the diffuser tube 36 is a second flux applicator 40 with a flexible seal 42 connected to the side of the second shroud 32. The second flux applicator 40 may be pivoted to select the direction of flux from the applicator 40. The diffuser tubes 22 and 36 blanket both the solder waves 10,26 with shield gas. A circuit board or other element 44 is supported by fingers 46 from a conveyor 48 and is sloped upwards so that the circuit board passes through the first solder wave 10 followed by the second solder wave 26.

In one embodiment only the first flux applicator 39 is provided, and flux which may be in gas, liquid or powder form is applied directly to the first solder wave 10. Whereas the shield gas supplied to the diffuser tubes 22,36 may include a reducing agent or other additives, the fluxing is primarily carried out by applying the flux from the first flux applicator 39 directly onto the solder wave. The first flux applicator 39 may be a gas knife if the flux is gaseous or has liquid or powder conveyed in a gaseous medium such as nitrogen. As shown in the drawing the first flux applicator 39 is positioned above the line of the conveyor 48, thus the flux will contact the circuit board 44 as it passes underneath. If the flux is in gaseous form, it blankets the circuit board.

In yet another embodiment additional flux is applied through the second flux applicator 40 which may also be a gas knife, the flux contacts the circuit board 44 to apply flux to the still liquid solder on the board and ensures that solder wetting or solder joining occurs.

Figure 2:
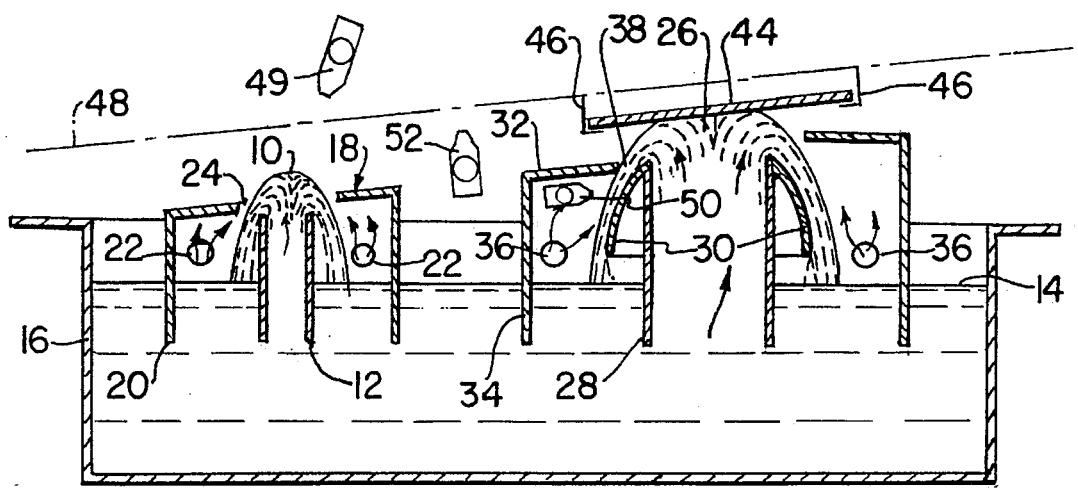
FIG. 2 is a schematic side elevation similar to FIG. 1 with a gas knife positioned between two shrouded solder waves.

Another embodiment is shown in FIG. 2 wherein the first flux applicator 49 is shown positioned above the conveyor 48 downstream of the first solder wave 10, diverting flux onto the first solder wave 10. A second flux applicator 50 is shown positioned under the second shroud 32 on the upstream side of the second solder wave 26. Flux is not applied through the shield gas diffusers 22,36 but is applied firstly by the first flux applicator 49 onto the first solder wave 10. In another embodiment, flux is applied through the second flux applicator onto the second solder wave 26 and pass up through the slot 36 to contact the element 44 as it is entering the solder wave 26. The flux may be in gas form, or may be in liquid or powder form, as the flux in some cases evaporates or sublimates at the high temperature under the shroud 32. The flux may be applied through both flux applicators or through either applicator depending upon flux requirements and the elements being solder coated.

Unlike the embodiment shown in FIG. 1, FIG. 2 shows no second gas applicator 40 downstream of the second solder wave 26 but shows another gas knife 50 positioned between the first solder wave 10 and the second solder wave 26. The second gas knife 52 which is also a flux applicator, is designed to apply additional flux to the under surface of the circuit board 44 as it is conveyed on the conveyor 48. The flux is preferably in gas form mixed with a shield gas or may be in liquid or solid form conveyed in the shield gas. The purpose of the intermediate application of flux is to take care of certain conditions where more time is needed for the flux to set on the surfaces to be solder coated or solder joined.

Figure 3:
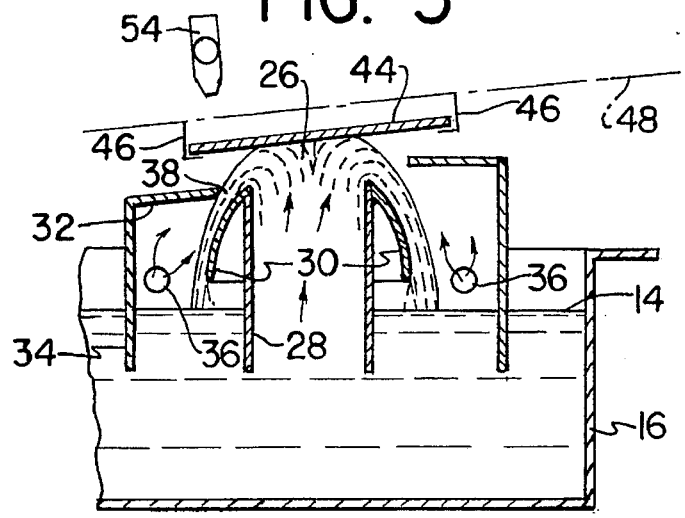
FIG. 3 is a schematic side elevation showing a gas knife position above a single shrouded solder wave.

In FIG. 3 is disclosed another embodiment wherein a flux applicator 54 is positioned above a solder wave 26 similar to the first flux applicator 39 shown in Figure 1. In this embodiment only one solder wave 26 is illustrated, however the flux applicator 54 could be applied to one solder wave of two or more, or to each solder wave depending upon the elements 44 in the form of circuit boards to be solder coated or solder joined.

In some circuit boards 44 holes pass through the board and solder wetting of the holes is required. The application of flux to the top surface of the boards allows flux to contact the top portions of these holes as the solder is wicking up the holes. The flux applicator 54 in one embodiment is a gas knife and the flux may be in gaseous form. Alternatively a liquid or powder flux mixed with a shield gas may be passed through the gas knife. Other types of flux applicators can be liquid sprays or jets, alternatively a powder applicator may be used.

Whereas the drawings illustrate the flux applicators in the form of a gas knife, in another embodiment liquid flux may be sprayed directly onto the solder wave through a liquid spray flux applicator. Furthermore, flux powder or flux in granular form can also be applied directly onto the solder wave from a powder flux applicator.

The flux may be applied to the solder wave before the element contacts the wave or while the element is in contact with the solder wave. Thus a fluxing action occurs to ensure proper solder wetting.

The flux, whether in solid, liquid or gaseous form, is preferably heated so that it does not cool the solder wave. In the case of shield gas used to convey the flux, the shield gas is preferably heated to ensure that the solder wave temperature does not drop. The circuit boards are also preferably preheated to avoid thermal shock when entering the solder wave.

Various changes may be made to the embodiments shown herein without departing from the scope of the present invention which is limited only by the following claims.

The embodiments of the present invention in which an exclusive property or privilege is claimed are defined as follows:

1. A process for wave soldering an element comprising the steps of:

forming a solder wave above a solder reservoir;

providing a shield gas to blanket the solder wave using a shield gas delivery means;

applying a flux from a flux applicator separate from said shield gas delivery means, the flux applicator directing the flux onto the solder wave; and conveying the element through at least a portion of the solder wave.

2. The process for wave soldering according to claim 1 wherein the flux is in powder or granular form.

3. The process for wave soldering according to claim 1 wherein the flux is in liquid form.

4. The process for wave soldering according to claim 1 wherein the flux is applied to the solder wave before the element contacts the solder wave.

5. The process soldering according to claim 1 wherein the flux is applied to the solder wave while the element is in contact with the solder wave.

6. The process for wave soldering according to claim 1 wherein the flux is in gaseous form.

7. The process for wave soldering according to claim 6 wherein the flux is a reducing gas.

8. The process for wave soldering according to claim 1 wherein the wave soldering occurs in a shield gas atmosphere substantially oxygen free.

9. The process for wave soldering according to claim 8 wherein the wave soldering occurs under a shroud.

10. The process for wave soldering according to claim 8 wherein the shield gas atmosphere is a substantially nitrogen atmosphere.

11. A process for wave soldering an element comprising the steps of:

projecting at least one solder wave from a solder nozzle above a solder reservoir containing solder, through a slot in a cover means extending over at least a portion of the solder reservoir;

providing gas delivery means positioned on at least one side of the solder wave underneath the cover means to pass shield gas through the slot and at least partially blanket the solder wave;

applying a flux directly onto the solder wave through a separate flux applicator, and passing the element in a predetermined path above the cover means so that at least a portion of the element passes through the solder wave while being at least partially blanketed by the shield gas.

12. The process for wave soldering according to claim 11 wherein the flux is in gaseous form and the flux applicator is positioned upstream of the solder wave above the predetermined path.

13. The process for wave soldering according to claim 11 wherein the flux is in gaseous form and the flux applicator is positioned upstream of the solder wave below the predetermined path.

14. The process for wave soldering according to claim 11 wherein the flux is in gaseous form and the flux applicator is positioned downstream of the solder wave above the predetermined path.

15. The process for wave soldering according to claim 11 wherein the flux is in gaseous form and the flux applicator is positioned downstream of the solder wave below the predetermined path.

16. The process for wave soldering according to claim 11 including an additional flux applicator positioned downstream of the solder wave and wherein flux in gaseous form is supplied through the additional flux applicator.

17. The process for wave soldering according to claim 16 wherein the additional flux applicator is a gas knife.

18. A process for wave soldering an element comprising the steps of:

projecting at least one solder wave from a solder nozzle above a solder reservoir containing solder, through a slot in a cover means extending over at least a portion of the solder reservoir;

providing gas delivery means positioned on at least one side of the solder wave underneath the cover means to pass shield gas through the slot and at least partially blanket the solder wave;

applying a flux directly onto the solder wave through a flux applicator positioned underneath the cover means, and passing the element in a predetermined path above the cover means so that at least a portion of the element passes through the solder wave while being at least partially blanketed by the shield gas.

19. The process for wave soldering an element according to claim 18 including applying additional flux on top of the element through an additional flux applicator as the element passes through the solder wave.

20. The process for wave soldering an element according to claim 19 wherein the additional flux applicator is a gas knife.

21. The process for wave soldering an element according to claim 18 including an additional flux applicator positioned upstream of the solder wave, and wherein additional flux in gaseous form is supplied through the additional flux applicator to contact under surfaces of the element prior to passing through the solder wave.

22. The process for wave soldering an element according to claim 21 wherein two solder waves are provided above the solder reservoir, and wherein the additional flux applicator is positioned between the two solder waves.

* * * * *